United States Patent
Ohtake et al.

(10) Patent No.: US 8,497,490 B2
(45) Date of Patent: Jul. 30, 2013

(54) TERAHERTZ WAVE GENERATION DEVICE AND METHOD FOR GENERATING TERAHERTZ WAVE

(75) Inventors: Hideyuki Ohtake, Kariya (JP); Yuzuru Uehara, Kariya (JP); Koichiro Tanaka, Kyoto (JP); Masaya Nagai, Kyoto (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 230 days.

(21) Appl. No.: 13/060,945

(22) PCT Filed: Aug. 24, 2009

(86) PCT No.: PCT/JP2009/064708
§ 371 (c)(1),
(2), (4) Date: Feb. 25, 2011

(87) PCT Pub. No.: WO2010/024213
PCT Pub. Date: Mar. 4, 2010

(65) Prior Publication Data
US 2011/0147621 A1 Jun. 23, 2011

(30) Foreign Application Priority Data

Aug. 26, 2008 (JP) .................................. 2008-217385

(51) Int. Cl.
*G21K 5/00* (2006.01)
(52) U.S. Cl.
USPC .................................... 250/504 R; 250/493.1
(58) Field of Classification Search
USPC ................................ 250/504 R, 493.1, 494.1
See application file for complete search history.

(56) References Cited

U.S. PATENT DOCUMENTS

| 6,697,186 | B2 | 2/2004 | Kawase et al. |
| 2006/0291862 | A1 | 12/2006 | Kawai |
| 2007/0071041 | A1 | 3/2007 | Eno et al. |
| 2007/0086713 | A1* | 4/2007 | Ingmar et al. ................. 385/122 |
| 2009/0207481 | A1 | 8/2009 | Okuno |

FOREIGN PATENT DOCUMENTS

| JP | 62-127810 A | 6/1987 |
| JP | 2002-072269 A | 3/2002 |

(Continued)

OTHER PUBLICATIONS

Stepanov, Andrel G., et al., "Efficient generation of subpicosecond terahertz radiation by phase-matched optical rectification using ultrashort laser pulses with tilted pulse fronts," Applied Physics Letter, Oct. 13, 2003, pp. 3000-3002, vol. 83, No. 15.
Yen, K.L., et al. "Generation of 10 µJ ultrashort terahertz pulses by optical rectification," Applied Physics Letters, 2007, pp. 17121-1-17121-3, vol. 90.
International Search Report for PCT/JP2009064708 dated Sep. 29, 2009.

(Continued)

*Primary Examiner* — Nicole Ippolito
(74) *Attorney, Agent, or Firm* — Sughrue Mion, PLLC

(57) ABSTRACT

A terahertz wave generation device is provided with an ultra-short pulse laser light source (3) for generating ultra-short pulse laser light at a single repeating frequency and optical fibers (F1 to F5) for respective transmitting and projecting of the ultra-short pulse laser light to an LN crystal (15). Projection units (13) of the optical fibers (F1 to F5) are made parallel to irradiate the ultra-short pulse laser light (L) projected from the projection units (13), respectively, on terahertz transmission line (A) in the LN crystal (15) with sequential delays. The optical lengths of the transmission paths of the optical fibers (F1 to F5) are set longer as the transmission paths go closer to one side of the parallel direction of the projection units (13).

10 Claims, 5 Drawing Sheets

FOREIGN PATENT DOCUMENTS

| | | |
|---|---|---|
| JP | 2005-077470 A | 3/2005 |
| JP | 2005-317669 A | 11/2005 |
| JP | 2007-081233 A | 3/2007 |
| JP | 2008-152133 A | 7/2008 |
| WO | 2005/085947 A1 | 9/2005 |

OTHER PUBLICATIONS

Japanese Office Action dated Dec. 18, 2012 issued in Japanese Patent Application No. 2008-217385.

* cited by examiner

TERAHERTZ WAVE GENERATION DEVICE AND METHOD FOR GENERATING TERAHERTZ WAVE

TECHNICAL FIELD

The present invention relates to a terahertz wave generation device that generates terahertz waves in a direction satisfying non-collinear phase matching conditions by irradiating ultra-short pulse laser light inside a non-linear optical crystal, and a terahertz wave generating method.

BACKGROUND ART

As conventional terahertz wave generating methods, Non-Patent Literature 1 discloses three methods, namely an antenna method, a non-linear effect method and a magnetic field application method. In the antenna element method, a voltage bias is applied on a photoconductive antenna that is a microstructure formed on a semiconductor substrate, and in that state ultra-short pulse laser light irradiates the photoconductive antenna, thereby generating terahertz waves. In the non-linear effect method, terahertz waves are generated by irradiating ultra-short pulse laser light on a material having a non-linear receptivity $\chi$ (2) on the basis of a light rectification effect. In the magnetic field application method, a magnetic field is applied in parallel on a semiconductor surface, and in that state ultra-short pulse laser light irradiates the semiconductor surface, thereby generating terahertz waves.

Non-Patent Literature 2 discloses a method for tilting the wavefront of the laser light irradiating a non-linear optical crystal with respect to the surface of the non-linear optical crystal as a method of generating Cherenkov radiation in the non-linear optical crystal so as to obtain high-strength terahertz waves. With this method, the wavefront of the laser light is tilted by using a diffraction image transmission system composed of a diffraction grating and lens.

In addition, as one terahertz wave generating method, there is a method of projecting a pump wave onto a nonlinear optical crystal capable of being used in parametric oscillation. FIG. 10 shows the terahertz wave generating principle under this method. With this method, when pulse laser light L is incident on a non-linear optical crystal 100 from a direction orthogonal to the optical axis Z of this non-linear optical crystal 100, a parametric interaction is occurred inside the non-linear optical crystal 100 and a terahertz wave T is generated in a direction A satisfying the non-collinear phase matching conditions. As this terahertz wave generating method, Patent Literature 1 discloses a method using two laser generators. Of these two, one laser generator is a YAG laser that outputs pulse laser light, and the pulse laser light here is set to a pulse width of 15 ns and a wavelength of 1064 nm. The other laser generator is a Yb fiber laser that outputs continuous laser light. The continuous laser light here is used as a terahertz wave injection seeder, and the wavelength is fixed at 1070.2 nm in order to improve terahertz wave strength.

PRIOR ART LITERATURE

Patent Literature

Patent Literature 1: Unexamined Japanese Patent Application KOKAI Publication No. 2002-72269.

Non-Patent Literature

Non-Patent Literature 1: "Journal of the Spectroscopical Society of Japan", The Spectroscopical Society of Japan, 2001, Vol. 50, No. 6.

Non-Patent Literature 2: U.S. "Applied Physics Letters", American Institute of Physics, 2007, Vol. 90, pp. 17121-1 to 17121-3.

SUMMARY OF INVENTION

Problem to be Solved by the Invention

With the three terahertz wave generating methods described in Non-Patent Literature 1, the terahertz waves generated are weak, and for example, even in the case of the magnetic field application method, with which the highest strength can be obtained, the strength of the terahertz waves generated is around 8 J/pulse. Consequently, it is difficult to apply these terahertz wave generating methods to fields excluding prescribed spectroscopical measurements.

In addition, with the method described in Non-Patent Literature 2, it is necessary to create a diffraction grating with a complex structure in the terahertz wave generation device. Moreover, it is necessary to form a diffraction image near the focal point of the lens, making adjustment of the transmission system difficult.

In addition, with the method disclosed in Patent Literature 1, two laser generators are necessary as described above, and in order to stabilize the wavelength of the continuous laser light, it is necessary for the Yb fiber laser to be a mode-hop-free laser. With this method, only a terahertz wave having a time width on the order of nanoseconds can be generated. In addition, the manufacturing cost of the device becomes quite high.

In consideration of the foregoing, it is an object of the present invention to provide a terahertz wave generation device which has a simple structure and which can generate high-strength terahertz waves, and a method of generating terahertz waves.

Means for Solving the Problems

In order to achieve the above object, the terahertz wave generation device according to a first aspect of the present invention is a terahertz wave generation device for generating terahertz waves in a direction satisfying non-collinear phase matching conditions by projecting ultra-short pulse laser light on a non-linear optical crystal, having a pulse light source for generating the ultra-short pulse laser light and an irradiation unit for discretely irradiating the ultra-short pulse laser light generated by the pulse light source on terahertz wave transmission line in the non-linear optical crystal so that the ultra-short pulse laser light is in synchronous with transmission of the terahertz wave.

Preferably, the irradiation unit is provided with a plurality of optical fibers for receiving and transmitting the ultra-short pulse laser light generated by the pulse light source and projecting such toward the terahertz wave transmission line of the non-linear optical crystal so that the ultra-short pulse laser light is in synchronous with transmission of the terahertz wave, and the optical fibers have mutually differing optical path lengths.

Preferably, the irradiation unit is provided with a light distributor for splitting the ultra-short pulse laser light generated by the pulse light source into a plurality of ultra-short pulse laser lights and transmitting such to the plurality of optical fibers.

Preferably, the irradiation unit is provided with a length adjustment mechanism for adjusting the optical path lengths of the optical fibers, and this length adjustment mechanism is provided with drums around which the optical fibers are wound, and a tension changing unit for changing the tension of the optical fibers in a lengthwise direction by changing the diameter of the drums.

Preferably, the pulse light source is provided for each optical fiber.

Preferably, the irradiation unit is provided with a multi-core fiber having a plurality of cores as the transmission paths for receiving and transmitting the ultra-short pulse laser light generated by the pulse light source and projecting such toward the terahertz wave transmission line of the non-linear optical crystal so a that the ultra-short pulse laser light is in synchronous with transmission of the terahertz wave, and the plurality of cores have mutually differing optical path lengths.

Preferably, the projection units of the plurality of cores are positioned parallel to the direction of the terahertz wave transmission line, and the end surface composed of the projection units of the plurality of cores is shaped so as to have a predetermined angle, and the optical path lengths of the cores are longer toward one side in a direction parallel to the projection units.

Preferably, the pulse light source is provided for each of the cores.

Preferably, each pulse light source is provided with a timing adjustment mechanism for adjusting the generation timing of the ultra-short pulse laser light.

Preferably, at the projection unit of each of the transmission paths, a lens is provided for making desired values of the incident angle on the non-linear optical crystal and the spacing of arrival positions on the terahertz wave transmission line in the non-linear optical crystal of the ultra-short pulse laser light projected from the projection units.

In order to achieve the above object, the terahertz wave generating method according to a second aspect of the present invention is a method for generating terahertz waves in a direction satisfying non-collinear phase matching conditions by making ultra-short pulse laser light incident on a non-linear optical crystal, and includes irradiating a pulse laser light group having a discrete wave surface composed of a plurality of ultra-short pulse laser lights of a single repeating frequency toward the non-linear optical crystal, and transmitting the ultra-short pulse laser lights of the pulse laser light group to successively shifted positions on the terahertz wave transmission line so that such arrive with a time difference.

Preferably, the pulse laser light group is composed by the ultra-short pulse laser lights being transmitted via transmission paths and being projected from the projection units of the transmission paths toward the non-linear optical crystal; the shift in arrival positions of the ultra-short pulse laser lights on the transmission line is created by the projection units being parallel in one direction; and the difference in arrival times of the ultra-short pulse laser lights on the transmission line is created by the optical path lengths of the transmission paths being longer toward one side of the parallel direction of the projection units.

Effects of the Invention

With the terahertz wave generation device and generating method of the present invention, it is possible to generate high-strength terahertz waves with a simple structure and process.

BEST MODE FOR CARRYING OUT THE INVENTION

Figure 1:
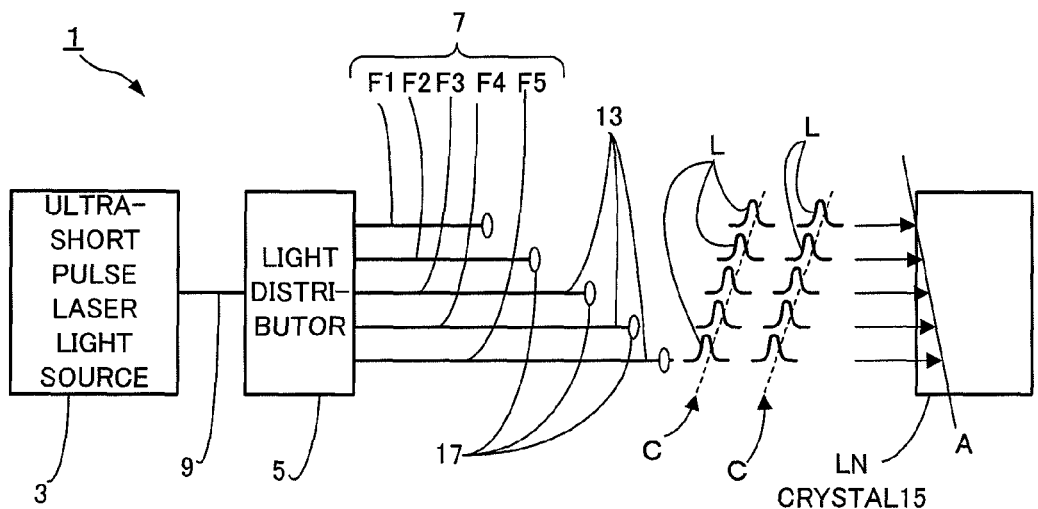
FIG. 1 is a block diagram showing the structure of a terahertz wave generation device according to a first embodiment of the present invention.

The preferred embodiments of the present invention are described in detail below with reference to the drawings. Identical or corresponding parts in the drawings are labeled with the same symbols, and explanation of such is not repeated.

(First Embodiment)

FIG. 1 shows the structure of a terahertz wave generation device according to a first embodiment.

The terahertz wave generation device 1 according to the first embodiment has an ultra-short pulse laser light source 3, a distributor 5 and a fiber bundle 7.

Figure 10:
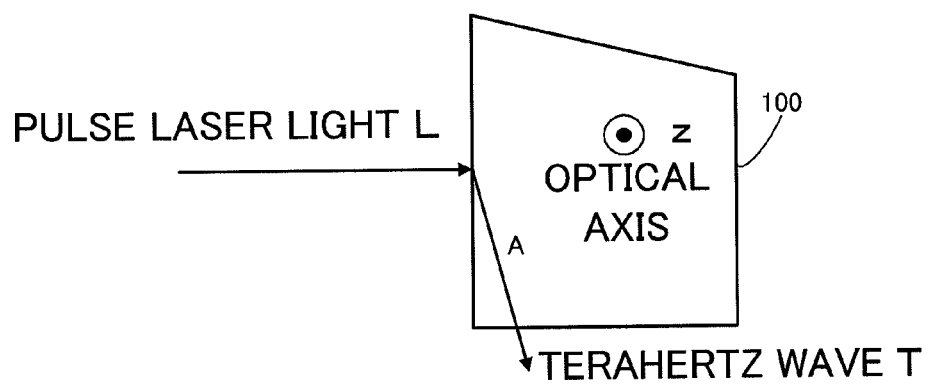
FIG. 10 is a drawing showing the generation principle of a terahertz wave generating method.

The ultra-short pulse laser light source 3 generates ultra-short pulse laser light having a single repeating frequency. The distributor 5 is connected to the ultra-short pulse laser light source 3 via one optical fiber 9. This distributor 5 splits the ultra-short pulse laser light projected from the ultra-short pulse laser light source 3 and also collimates this split ultra-short pulse laser light to less than the diameter of the transmission paths of the below-described optical fibers F1 to F5. The fiber bundle 7 is a bundle of the optical fibers F1 to F5, each of which is connected to the distributor 5. The ultra-short pulse laser lights split and collimated by the distributor 5 are simultaneously incident on the optical fibers F1 to F5. Furthermore, after transmitting the ultra-short pulse laser light, the optical fibers F1 to F5 project this ultra-short pulse laser light L from projection units 13 to an LN crystal 15 as a non-linear optical crystal (hereinafter simply called the LN crystal). The terahertz wave generation device 1 in this embodiment generates a terahertz wave T using the principle shown in FIG. 10, so the direction of the projection unit 13 of each optical fiber F1 to F5 is adjusted so that the ultra-short pulse laser light L is incident on the LN crystal 15 from a direction orthogonal to the optical axis of the LN crystal 15. Below, the optical fibers F1 to F5 are shown generally as optical fiber F. In addition, in the explanation of this embodiment, the number of optical fibers is taken to be 5, namely F1 to F5, but the number may be more than this.

The straight line shown in FIG. 1 shows the transmission line along which the terahertz wave T generated in the LN crystal 15 by irradiation by the ultra-short pulse laser light L advances in a direction satisfying the non-collinear phase matching condition. The projection unit 13 of each optical fiber F is arranged so that the ultra-short pulse laser light L projected from these projection units 13 sequentially irradiate the terahertz wave transmission line A. The optical path length of each optical fiber F becomes longer in a direction parallel to the projection units 13, that is to say to one side in the direction of the terahertz wave transmission line A. Specifically, these becoming longer in the order F1, F2, F3, F4 and F5. In addition, condenser lenses 17 are provided at the projection units 13 of the optical fiber F. By adjusting the curved surface and position of these lenses 17, the ultra-short pulse laser light L projected from the projection units 13 is condensed so as to be orthogonally incident on the surface of the LN crystal 15, and the condensing point of the ultra-short pulse laser light L is positioned with a predetermined spacing on the terahertz wave transmission line A.

With the terahertz wave generation device 1 having the above structure, each time the ultra-short pulse laser light source 3 projects ultra-short pulse laser light, the ultra-short pulse laser light is split and collimated by the distributor 5 and is simultaneously incident on the optical fiber F. Furthermore, after this split and collimated ultra-short pulse laser light L has been transmitted to the transmission paths of the optical fibers F, the light is projected from the projection unit 13 toward the LN crystal 15. As a result, a pulse laser light group C composed of the plurality of ultra-short pulse laser lights L and having a discrete wave surface advances toward the LN crystal 15.

When the various ultra-short pulse laser lights L that compose the pulse laser light group C here pass through the transmission paths of the optical fibers F, a time delay can be bestowed. This time delay is generated from optical fiber F materials with high refractive index, the value thereof being determined in accordance with the optical path lengths of the transmission paths of the optical fibers F. In this embodiment, because the optical path lengths of the transmission paths of the optical fibers F1 to F5 become longer toward one side in the parallel direction of the projection units 13 (that is to say, in the direction of the terahertz wave transmission line A), the time delay is larger for ultra-short pulse laser light L projected from the optical fibers F close to one side in the parallel direction of the projection units 13 (that is to say, in the direction of the terahertz wave transmission line A). Consequently, when the ultra-short pulse laser light is simultaneously incident on the optical fibers F1 to F5 from the distributor 5, the wave front of the pulse laser light group C becomes tilted so as to be delayed toward one side in the parallel direction of the projection units 13 (that is to say, in the direction of the terahertz transmission line A).

Figure 2:
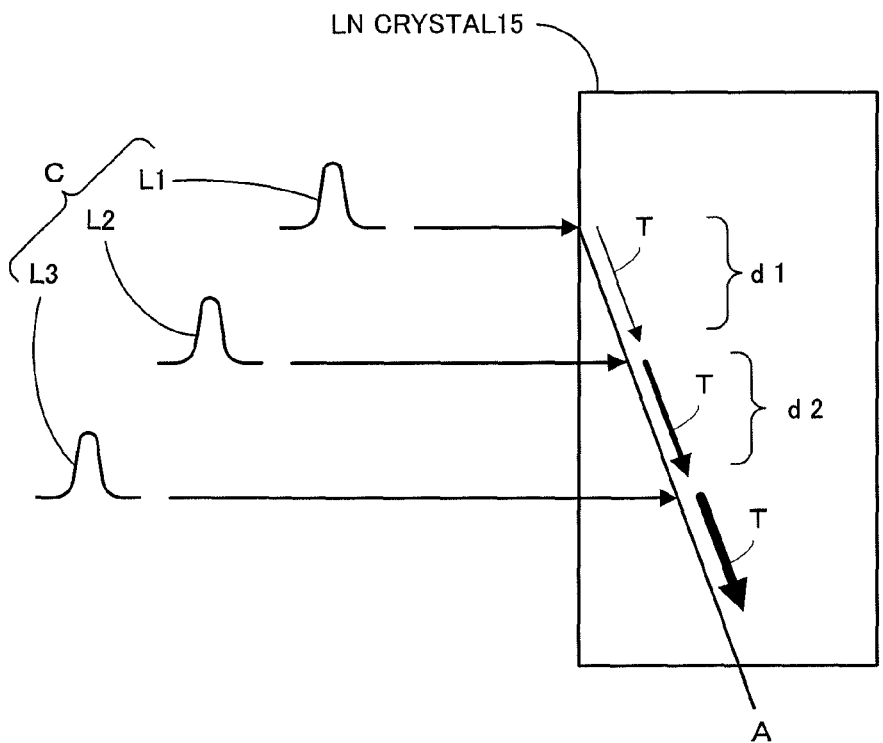
FIG. 2 is a drawing showing an enlargement of an ultra-short pulse laser light group incident on an LN crystal.

FIG. 2 shows an enlargement of the ultra-short pulse laser light group C incident on the LN crystal 15. Reference numbers L1 to L3 shown in FIG. 2 are the ultra-short pulse laser lights L contained in a single pulse laser light group C. L1 passes through the optical fiber F1 having the shortest transmission path, so the time delay is shortest. L2 passes through the optical fiber F2 having the second-shortest transmission path, so the time delay is second shortest. L3 passes through the optical fiber F3 with the third-shortest transmission path, so the time delay is third shortest.

Out of the plurality of ultra-short pulse laser lights L that comprise the pulse laser light group C, the ultra-short pulse laser light L1 having the shortest time delay arrives first at the LN crystal 15. As a result, a terahertz wave T is generated in the LN crystal 15 through parametric fluorescence, and a portion of this terahertz wave T propagates in the direction of the transmission line A. Furthermore, when the terahertz wave T has advanced a predetermined distance d1 in the direction of the transmission line A, the ultra-short pulse laser light L2 having the second shortest time delay arrives at the post-advancement position, and parametric amplification is created through parametric interaction. As a result, the strength of the terahertz wave T is amplified. Furthermore, when the terahertz wave T has advanced a predetermined distance d2 in the direction of the transmission line A, the ultra-short pulse laser light L3 having the third shortest time delay arrives at the post-advancement position and the strength of the terahertz wave T is again amplified. This process of amplifying strength is repeated until the ultra-short pulse laser light L having the longest time delay arrives at the LN crystal 15. As a result, the terahertz wave T becomes very strong.

During the course of the terahertz wave T propagating inside the LN crystal 15, absorption of the terahertz wave T by the LN crystal occurs. For this reason, in the present embodiment, the pulse amplitude of the laser light generated by the ultra-short pulse laser light source 3 and the spacing of the ultra-short pulse laser lights L in the pulse laser light group C are adjusted so that the gain in strength of the terahertz wave T is larger than the absorption amount.

With the present embodiment, as the pulse laser light group C composed of a plurality of ultra-short pulse laser lights L advances toward the LN crystal 15, the ultra-short pulse laser lights L in the pulse laser light group C arrive at positions successively shifted on the transmission line A of the terahertz wave A with time differences, so it is possible to successively irradiate each ultra-short pulse laser light L on the terahertz wave T created in the LN crystal 15. Through this, a very strong terahertz wave is generated. Furthermore, in addition to providing a plurality of optical fibers F in the terahertz wave generation device 1, the structure of the device obtained through adjusting the optical path length of the transmission path and the position of the projection units 13 of the various optical fibers F is simple.

In addition, by adjusting the position of the projection units 13 and the optical path lengths of the transmission paths in the various optical fibers F, the position and timing of arrival of the ultra-short pulse laser lights L in the pulse laser light group C on the terahertz wave transmission line A can be adjusted. Through this, the shape of the LN crystal 15 and the relative positions of the LN crystal 15 and the terahertz wave generation device 1 can be arbitrarily set.

In addition, by adjusting the position and curved surface of the lens 17, it is possible to condense the ultra-short pulse laser lights L projected from the various optical fibers F to the desired positions. Through this, it is possible to make the amplification of the terahertz wave through the ultra-short pulse laser lights L projected from the various optical fibers F certain. Through this, a very strong terahertz wave is generated with certainty.

With this embodiment, the lens 17 may be omitted. In this case, the strength of the terahertz wave can be amplified by tilting the wave front of the pulse laser light group C (that is to say, giving sequential time delays to the various ultra-short pulse laser lights L of the pulse laser light group C) so that the beam-like ultra-short pulse laser lights L irradiate the terahertz wave in succession.

(Second Embodiment)

Figure 3:
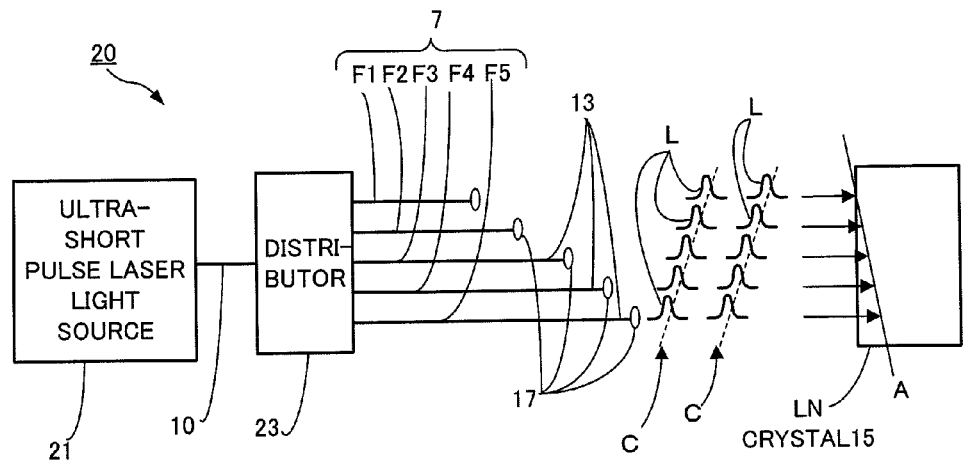
FIG. 3 is a block diagram showing the structure of a terahertz wave generation device according to a second embodiment of the present invention.

FIG. 3 is a block diagram showing the structure of a terahertz wave generation device 20 according to a second embodiment. This terahertz wave generation device 20 is provided with an ultra-short pulse fiber laser light source 21 and a distributor 23 instead of the ultra-short pulse laser light source 3 and the distributor 5 in the first embodiment. Differences from the first embodiment are explained below.

The ultra-short pulse fiber laser light source 21 generates ultra-short pulse laser light of a single repeating frequency, and collimates the generated ultra-short pulse laser light to less than the diameter of the transmission path of the optical fibers F. The distributor 23 is connected to the ultra-short pulse fiber laser light source 21 via a single optical fiber 10. This distributor 21 splits the ultra-short pulse laser light projected from the ultra-short pulse fiber laser light source 21 into a plurality of ultra-short pulse laser lights, and projects the split ultra-short pulse laser lights simultaneously toward the various optical fibers F. In this embodiment, as in the first embodiment, the positions of the projection units 13 and the optical path lengths of the various optical fibers F, along with the curved surface and the position of the lens 17, can be adjusted, and consequently the same effect as in the first embodiment can be exhibited.

(Third Embodiment)

Figure 4:
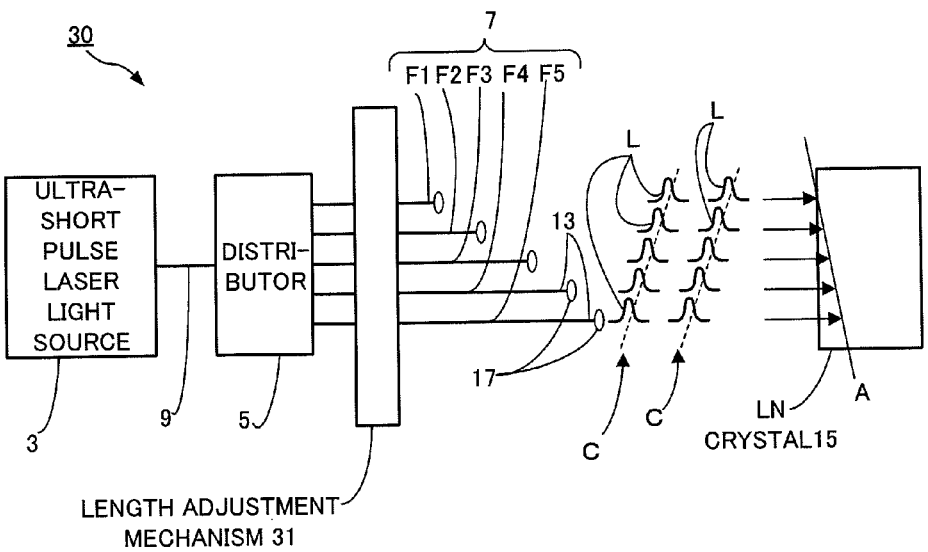
FIG. 4 is a block diagram showing the structure of a terahertz wave generation device according to a third embodiment of the present invention.

FIG. 4 is a block diagram showing the structure of a terahertz wave generation device 30 according to a third embodiment. This terahertz wave generation device 30 is the terahertz wave generation device 1 according to the first embodiment to which has been added a length adjustment mechanism 31 for adjusting the optical path lengths of the transmission paths of the optical fibers F. Differences from the first embodiment are explained below.

The length adjustment mechanism 31 is provided with drums (unrepresented) around which the various optical fibers F1 to F5 are wound, and a piezoelectric unit (unrepresented) for changing the diameter of each drum. By changing the diameters of the drums, it is possible to change the tension in the lengthwise direction applied to the optical fibers F1 to F5.

With this embodiment, by changing the tension in the lengthwise direction applied to the optical fibers F1 to F5 by operating the length adjustment mechanism 31, the lengths of the optical fibers F1 to F5 change, so it is possible to adjust the optical path lengths of the transmission paths in the optical fibers F1 to F5 to the desired lengths. Through this, it is possible to set the time delay given to the ultra-short pulse laser lights L projected from the optical fibers F1 to F5 within a wider range. Through this, the ultra-short pulse laser lights L projected from the optical fibers F1 to F5 can irradiate the terahertz wave on the terahertz wave transmission line A with certainty.

More preferably, the piezoelectric unit is connected to a computer (unrepresented) and the drum diameters are changed based on signals from the computer. In this case, the computer can be electrically connected to a sensor (unrepresented) that measures the strength of the terahertz wave, and computes the amount of change in the diameters of the drums on the basis of the measured values from the sensor. Furthermore, the computer transmits signals that cause changes by the computed amounts to occur in the drums to the piezoelectric device. Through this, the optical path lengths of the transmission paths in the optical fibers F1 to F5 can be adjusted based on the current generation strength of the terahertz wave T, so it is possible to adjust the generation strength of the terahertz wave T to the desired value.

(Fourth Embodiment)

Figure 5:
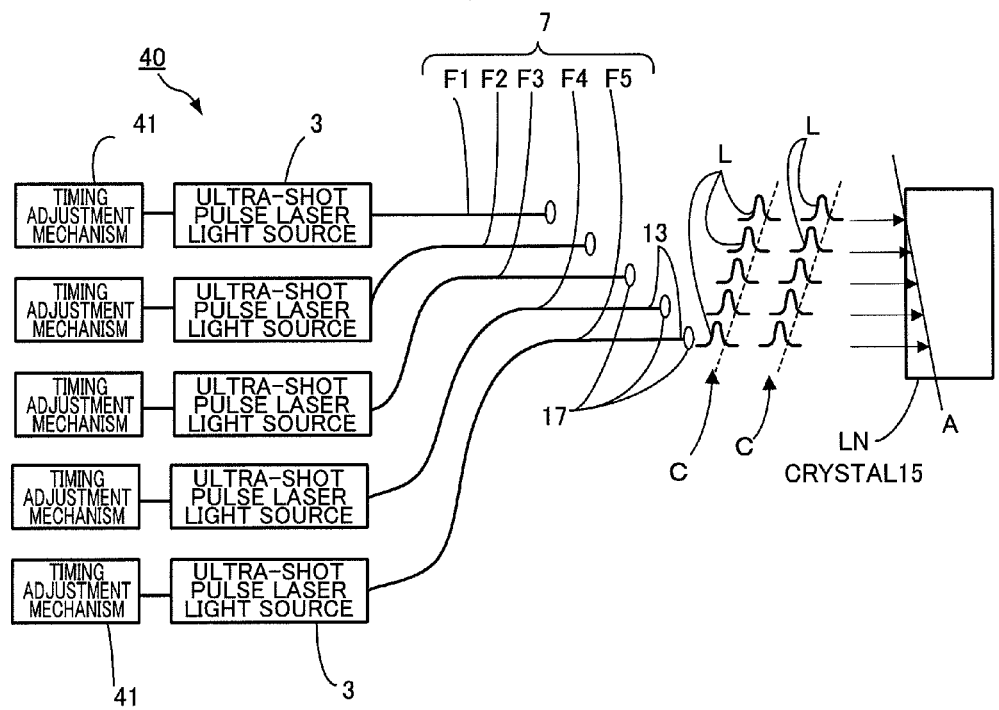
FIG. 5 is a block diagram showing the structure of a terahertz wave generation device according to a fourth embodiment of the present invention.

FIG. 5 is a block diagram showing the structure of a terahertz wave generation device 40 according to a fourth embodiment. This terahertz wave generation device 40 is the terahertz wave generation device 1 according to the first embodiment, further provided with a plurality of ultra-short pulse laser light sources 3. The ultra-short pulse laser lights L that comprise the pulse laser light group C are each generated by a different ultra-short pulse laser light source 3. Differences from the first embodiment are explained below.

In the fourth embodiment, the distributor shown in FIG. 1 is omitted and the ultra-short pulse laser light sources 3 are provided for each optical fiber F of the fiber bundle 7. After the ultra-short pulse laser light generated by the corresponding ultra-short pulse laser light source 3 has been transmitted, each optical fiber F projects this ultra-short pulse laser light L toward the LN crystal 15.

In addition, a timing adjustment mechanism 41 for adjusting the timing of generating the laser light is connected to each of the ultra-short pulse laser light sources 3. By operating this timing adjustment mechanism, each ultra-short pulse laser light source 3 projects ultra-short pulse laser light simultaneously to the corresponding optical fiber F.

With the present embodiment, it is possible for the ultra-short pulse laser light to be simultaneously incident on each of the optical fibers F without providing the distributor 5.

As in the present embodiment, when a plurality of ultra-short pulse laser light sources 3 are provided, the optical path lengths in the transmission paths of the optical fibers F may be set to a constant value. In this case, it is possible to provide the desired tilt to the wavefront of the pulse laser light group C by successively shifting the generation timing of the laser lights from the ultra-short pulse laser light sources 3 with an appropriate span. Each timing adjustment mechanism 41 can be controlled by a personal computer, so it is possible to adjust the light pulse projection unit timing from the corresponding ultra-short pulse laser light source 3 to the desired time.

(Fifth Embodiment)

Figure 6:
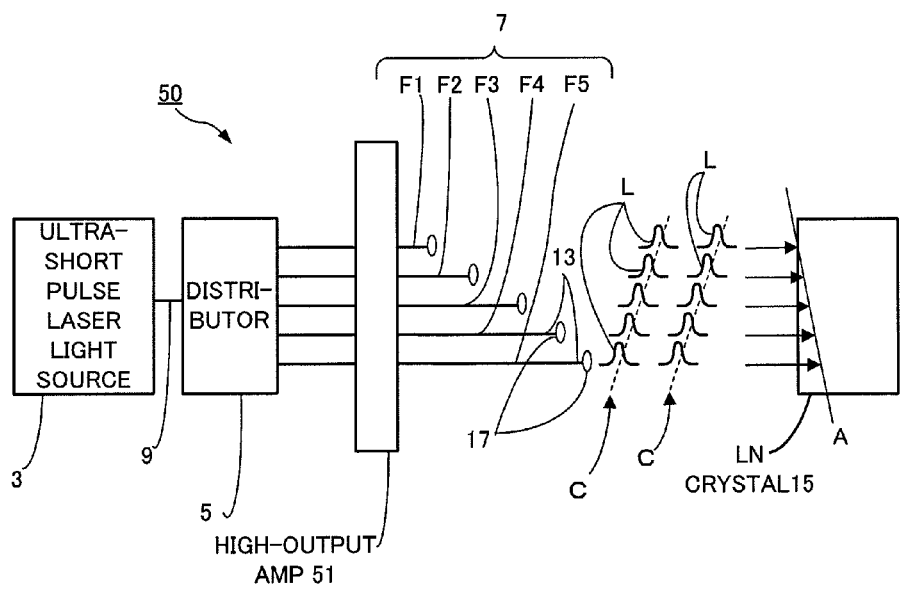
FIG. 6 is a block diagram showing the structure of a terahertz wave generation device according to a fifth embodiment of the present invention.

FIG. 6 is a block diagram showing the structure of a terahertz wave generation device 50 according to a fifth embodiment. This terahertz wave generation device 50 is the terahertz wave generation device 1 according to the first embodiment to which a below-described high-output amp 51 has been added. Differences from the first embodiment are explained below.

In the fifth embodiment, the high-output amp 51 is provided in order to increase the output of the ultra-short pulse laser light passing through the transmission path of each optical fiber F.

With this embodiment, ultra-short pulse laser light L whose strength has been increased by the high-output amp 51 is projected from each optical fiber F toward the LN crystal 15. Consequently, when the ultra-short pulse laser light L projected from each optical fiber F irradiates the terahertz wave, the size of the strength amplitude of the terahertz wave becomes larger, so that a strong terahertz wave is generated.

Figure 7:
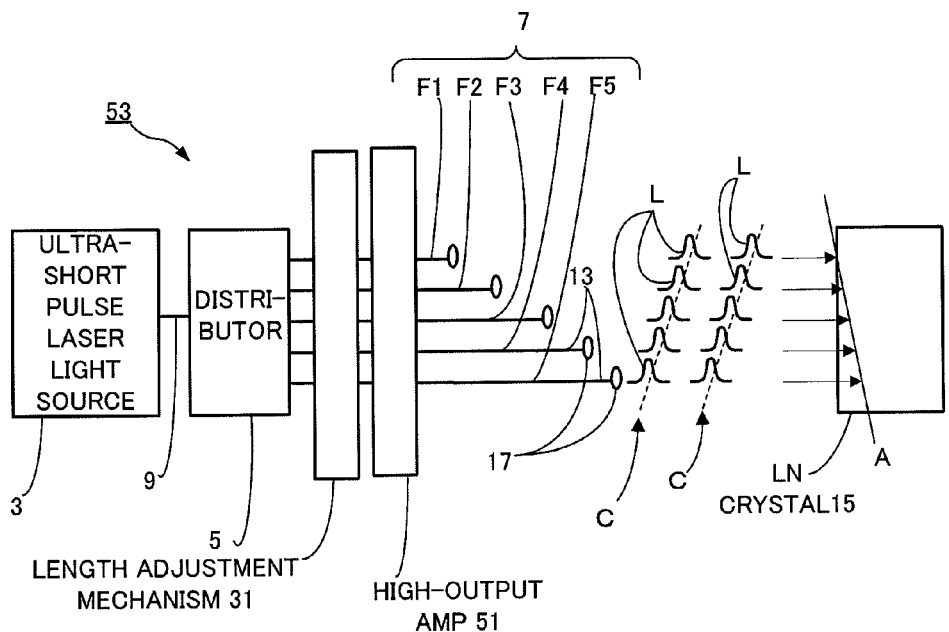
FIG. 7 is a block diagram showing a variation of the fifth embodiment.

A variation on this embodiment is shown in FIG. 7. A terahertz wave generation device 53 according to this variation has the length adjustment mechanism 31 explained in the third embodiment provided on the optical fibers F1 to F5 so as to be positioned preceding the high-output amp 51. With this variation, it is possible to endow the ultra-short pulse laser light L whose strength has been increased by the high-output amp 51 with the desired time delay by causing the length adjustment mechanism 31 to adjust the optical path length of the optical fibers F1 to F5. Through this, it is possible for the high-strength ultra-short pulse laser light L to irradiate the terahertz wave on the terahertz wave transmission line A with certainty, thereby generating an even stronger terahertz wave.

(Sixth Embodiment)

Figure 8:
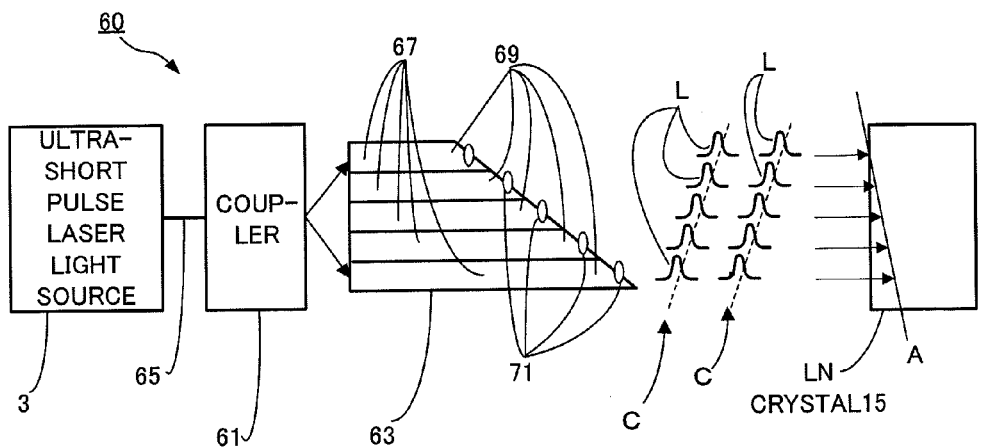
FIG. 8 is a block diagram showing the structure of a terahertz wave generation device according to a sixth embodiment of the present invention.

FIG. 8 is a block diagram showing the structure of a terahertz wave generation device 60 according to a sixth embodiment. In this terahertz wave generation device 60, a coupler 61 and a multi-core fiber 63 are provided in place of the distributor 5 and the fiber bundle 7 of the first embodiment. Differences from the first embodiment are explained below.

The coupler 61 is connected to the ultra-short pulse laser light source 3 via the optical fiber 65, and makes the strength of the ultra-short pulse laser light projected from the ultra-short pulse laser light source 3 uniform.

The multi-core fiber 63 is composed of a plurality of transmission paths 67 and a clad unit (unlabeled) that covers the plurality of transmission paths 67. the transmission paths 67 are directly connected to the projection unit of the coupler 61 so that the ultra-short pulse laser light whose strength has been made uniform by the coupler 61 is simultaneously incident on the transmission paths 67.

In addition, the orientation of the projection units 69 of the transmission paths 67 is adjusted so that the ultra-short pulse laser light L projected from the projection units 69 is incident on the LN crystal 15 from a direction orthogonal to the optical axis of the LN crystal 15. In addition, the projection units 69 of the transmission paths 67 are arranged so that the ultra-short pulse laser light L projected from the projection units 69 irradiates with successive shifts the terahertz wave transmission line A. In addition, because the projection unit side end surface of the multi-core fiber 63 is ground to a desired inclination, the optical path lengths of the transmission paths 67 becomes longer toward one side of the parallel direction of the projection units 69 (that is to say, in the direction of the terahertz wave transmission line A). In addition, condenser lenses 71 for condensing light are provided at the projection units 69. Here, by adjusting the curved surface and position of each lens 71, the ultra-short pulse laser light L projected from each projection unit 69 is condensed so as to be orthogonally incident on the surface of the LN crystal 15, and the focal point of each ultra-short pulse laser light L is positioned with a predetermined spacing on the terahertz wave transmission line A.

With this embodiment, each time the ultra-short pulse laser light source 3 projects ultra-short pulse laser light L, this ultra-short pulse laser light L is simultaneously incident on the transmission paths of the multi-core fiber 63 after the strength has been made uniform by the coupler 61. Furthermore, the ultra-short pulse laser light L incident on the transmission paths 67 is projected from the projection units 69 toward the LN crystal 15. As a result, the pulse laser light group C having a discrete wave surface composed of a plurality of ultra-short pulse laser lights L advances toward the LN crystal 15, the same as in the first embodiment. Moreover, the optical path lengths of the transmission paths 67 of the multi-core fiber 63 become longer toward one side in the parallel direction of the projection units 69 (that is to say, in the direction of the terahertz wave transmission line A), so the wave front of the pulse laser light group C becomes inclined so as to be delayed toward one side of the parallel direction of the projection units 69 (that is to say, in the direction of the terahertz wave transmission line A). As a result, because the ultra-short pulse laser lights L of the pulse laser light group C arrive with a time difference at positions successively shifted on the terahertz wave transmission line A, it is possible to repeatedly irradiate the ultra-short pulse laser lights L on the terahertz wave T, the same as in the first embodiment. Through this, a very strong terahertz wave T is generated in the LN crystal 15. Furthermore, the structure of the device obtained by providing a multi-core fiber 63 and adjusting the positions of the projection units 69 of the transmission paths 67 and the optical path lengths of the transmission paths 67 in the multi-core fiber 63 is simple.

In addition, by adjusting the positions of the projection units 69 of the transmission paths 67 and adjusting the grinding inclination of the projection unit side end surface of the multi-core fiber 63 in order to adjust the optical path lengths of the transmission paths 67, it is possible to adjust the arrival time and the position where the ultra-short pulse laser lights L of the pulse laser light group C are irradiated on the terahertz wave transmission line A. Through this, it is possible to arbitrarily set the relative positions of the LN crystal 15 and the terahertz wave generation device 60 and the shape of the LN crystal 15.

In addition, by adjusting the curved surfaces and positions of the lenses 71, it is possible to condense the ultra-short pulse laser lights L projected from the transmission paths 67 to a desired location, so that a very strong terahertz wave T is generated with certainty.

Figure 9:
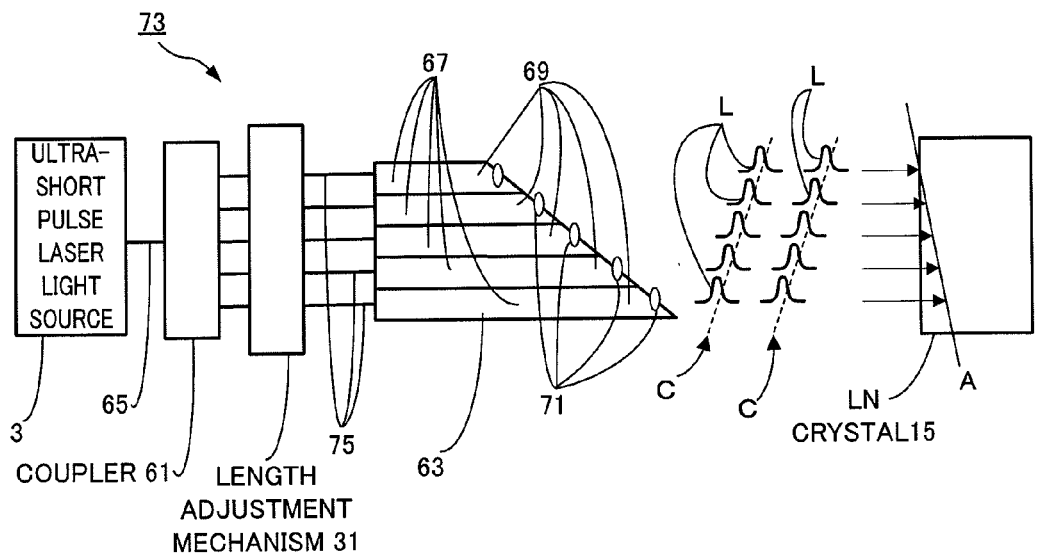
FIG. 9 is a block diagram showing a variation of the sixth embodiment.

FIG. 9 shows a variation on this embodiment. In the terahertz wave generation device 73 of this variation, the transmission paths 67 of the multi-core fiber 63 are connected to the projection unit of the coupler 61 via optical fibers 75, and the ultra-short pulse laser lights are incident from the coupler via these optical fibers 75. In this terahertz wave generation device 73, the length adjustment mechanism 31 shown in the third embodiment is provided in a position subsequent to the coupler 61 with respect to the optical fibers 75.

With this variation, by adjusting the optical path length of the optical fibers 75 using the length adjustment mechanism 31, it is possible to set the time delay given to the ultra-short pulse laser lights L projected from the transmission paths 67 in a wider range. Through this, the ultra-short pulse laser lights L projected from the transmission paths 67 irradiate the terahertz wave T on the terahertz wave transmission line A with certainty.

In this embodiment, the ultra-short pulse laser light source 3 may be provided for each transmission path 67 of the multi-core fiber 63. In this case, the transmission paths 67 are connected to the ultra-short pulse laser light source 3 via optical fibers, and the ultra-short pulse laser lights are incident from the ultra-short pulse laser light source 3. In addition, in this case the timing adjustment mechanism 41 shown in FIG. 5 may be connected to the ultra-short pulse laser light source 3. Through this, it is possible to make the ultra-short pulse laser lights generated by the ultra-short pulse laser light source 3 simultaneously incident in the transmission paths 67 of the multi-core fiber 63.

This application claims the benefit of Japanese Patent Application No. 2008-217385, filed Aug. 26, 2008, the entire disclosure of which is incorporated by reference herein.

Industrial Applicability

The present invention is a device for generating a very strong terahertz wave, and has extremely high industrial applicability, such as being usable for measuring multilayer automotive film thickness.

Explanation of Symbols 1, 20, 30, 40, 50, 53, 60, 73 terahertz wave generation device
7 fiber bundle
9, 10, 65, 75 optical fiber
3 ultra-short pulse laser light source
5, 23 distributor
13, 69 projection unit
15 LN crystal
17, 71 lens
21 ultra-short pulse fiber laser light source
31 length adjustment mechanism
41 timing adjustment mechanism 51 high-output amp
61 coupler
63 multi-core fiber
67 transmission path
A terahertz wave transmission line
C pulse laser light group
F1 to F5 optical fibers
L ultra-short pulse laser light
T terahertz wave

The invention claimed is:

1. A terahertz wave generation device for generating terahertz waves in a direction satisfying non-collinear phase matching conditions by projecting ultra-short pulse laser light on a non-linear optical crystal, the terahertz wave generation device comprising:
   a pulse light source for generating the ultra-short pulse laser light; and
   an irradiation unit for discretely irradiating the ultra-short pulse laser light generated by the pulse light source on terahertz wave transmission line in the non-linear optical crystal so that the ultra-short pulse laser light is in synchronous with transmission of the terahertz wave; wherein
   the irradiation unit comprises a plurality of optical fibers for receiving and transmitting the ultra-short pulse laser light generated by the pulse light source and projecting such toward the terahertz wave transmission line of the non-linear optical crystal so that the ultra-short pulse laser light is in synchronous with transmission of the terahertz wave;
   the optical fibers have mutually differing optical path lengths;
   the irradiation unit further comprises a light distributor for splitting the ultra-short pulse laser light generated by the pulse light source into a plurality of ultra-short pulse laser lights and transmitting such to the plurality of optical fibers;
   the irradiation unit further comprises a length adjustment mechanism for adjusting the optical path lengths of the optical fibers; and
   the length adjustment mechanism comprises drums around which the optical fibers are wound, and a tension changing unit for changing the tension of the optical fibers in a lengthwise direction by changing the diameter of the drums.

2. The terahertz wave generation device according to claim 1, wherein the pulse light source is provided for each optical fiber.

3. The terahertz wave generation device according to claim 2, wherein each pulse light source comprises a timing adjustment mechanism for adjusting the generation timing of the ultra-short pulse laser light.

4. The terahertz wave generation device according to claim 3, wherein at the projection unit of each of the transmission paths, a lens is provided for making desired values of the incident angle on the non-linear optical crystal and the spacing of arrival positions on the terahertz wave transmission line in the non-linear optical crystal of the ultra-short pulse laser light projected from the projection units.

5. A terahertz wave generation device for generating terahertz waves in a direction satisfying non-collinear phase matching conditions by projecting ultra-short pulse laser light on a non-linear optical crystal, the terahertz wave generation device comprising:
   a pulse light source for generating the ultra-short pulse laser light; and
   an irradiation unit for discretely irradiating the ultra-short pulse laser light generated by the pulse light source on terahertz wave transmission line in the non-linear optical crystal so that the ultra-short pulse laser light is in synchronous with transmission of the terahertz wave; wherein
   the irradiation unit comprises a multi-core fiber having a plurality of cores connected to respective optical fibers as transmission paths for receiving and transmitting the ultra-short pulse laser light generated by the pulse light source and projecting such toward the terahertz wave transmission line of the non-linear optical crystal so that the ultra-short pulse laser light is in synchronous with transmission of the terahertz wave;
   the plurality of cores have mutually differing optical path lengths;
   the irradiation unit further comprises a length adjustment mechanism for adjusting the optical path lengths of the optical fibers; and
   the length adjustment mechanism comprises drums around which the optical fibers are wound, and a tension changing unit for changing the tension of the optical fibers in a lengthwise direction by changing the diameter of the drums.

6. The terahertz wave generation device according to claim 5, wherein projection units of the plurality of cores are positioned parallel to the direction of the terahertz wave transmission line; and
   the end surface composed of the projection units of the plurality of cores is shaped so as to have a predetermined angle, and the optical path lengths of the cores are longer toward one side in a direction parallel to the projection units.

7. The terahertz wave generation device according to claim 6, wherein the pulse light source is provided for each of the cores.

8. The terahertz wave generation device according to claim 7, wherein each pulse light source comprises a timing adjustment mechanism for adjusting the generation timing of the ultra-short pulse laser light.

9. The terahertz wave generation device according to claim 8, wherein at the projection unit of each of the transmission paths, a lens is provided for making desired values of the incident angle on the non-linear optical crystal and the spacing of arrival positions on the terahertz wave transmission line in the non-linear optical crystal of the ultra-short pulse laser light projected from the projection units.

10. A method for generating terahertz waves in a direction satisfying non-collinear phase matching conditions by making ultra-short pulse laser light incident on a non-linear optical crystal, the method comprising:
    a step of irradiating a pulse laser light group having a discrete wave surface composed of a plurality of ultra-short pulse laser lights of a single repeating frequency toward the non-linear optical crystal; and
    a step of transmitting the ultra-short pulse laser lights of the pulse laser light group to successively shifted positions on the terahertz wave transmission line so that such arrive with a time difference; wherein
    the pulse laser light group is composed by the ultra-short pulse laser lights being transmitted via transmission paths comprising optical fibers and being projected from projection units of the transmission paths toward the non-linear optical crystal;
    the shift in arrival positions of the ultra-short pulse laser lights on the transmission line is created by the projection units being parallel in one direction; and the difference in arrival times of the ultra-short pulse laser lights on the transmission line is created by the optical path lengths of the transmission paths being longer toward one side of the parallel direction of the projection units; and the terahertz wave generating method further comprising a step of adjusting the optical path lengths of the optical fibers with a length adjustment mechanism; wherein the length adjustment mechanism comprises drums around which the optical fibers are wound, and a tension changing unit for changing the tension of the optical fibers in a lengthwise direction by changing the diameter of the drums.

* * * * *